United States Patent [19]

Boss

[11] Patent Number: 4,485,740
[45] Date of Patent: Dec. 4, 1984

[54] COUPLING ASSEMBLY FOR JOINING TUBULAR SECTIONS

[75] Inventor: Harold O. Boss, Corona Del Mar, Calif.

[73] Assignee: Ford Aerospace & Communications Corporation, Detroit, Mich.

[21] Appl. No.: 333,951

[22] Filed: Dec. 23, 1981

[51] Int. Cl.³ ............................ F16D 1/00; F16B 7/10; B65D 45/00
[52] U.S. Cl. ................................... 102/293; 220/8; 220/325; 220/328; 292/256.6; 403/378
[58] Field of Search ............... 102/293; 244/119, 120, 244/125, 131, 3.16; 220/8, 325, 328; 285/403, 404; 292/256.6, 256.71, 256.73; 403/378, 379, 377

[56] References Cited

U.S. PATENT DOCUMENTS

| | | | |
|---|---|---|---|
| 947,711 | 1/1910 | Costa | |
| 969,776 | 9/1910 | Foley | 220/328 |
| 2,226,495 | 12/1940 | Jacocks | 292/256.6 |
| 2,258,135 | 10/1941 | Curtis | 285/165 |
| 2,761,279 | 9/1956 | Smith | 220/328 |
| 2,774,508 | 12/1956 | Larsen | 220/328 |
| 2,868,565 | 1/1959 | Suderow | 285/308 |
| 2,877,732 | 3/1959 | Eaton | 114/22 |
| 3,030,253 | 4/1962 | St. John et al. | 156/196 |
| 3,120,402 | 2/1964 | Wallen | 285/403 |
| 3,131,635 | 5/1964 | Steinmetz, Jr. et al. | 102/378 |
| 3,287,032 | 11/1966 | Kraybill | 285/39 |
| 3,472,538 | 10/1969 | Vincent et al. | 285/374 |
| 3,694,007 | 9/1972 | Crow et al. | 285/5 |
| 3,764,170 | 10/1973 | Brown | 285/412 |
| 3,768,550 | 10/1973 | Williamson et al. | 285/368 |
| 3,850,455 | 11/1974 | Stafford | 285/368 |
| 3,895,833 | 7/1975 | Thiessen | 285/368 |
| 3,942,141 | 3/1976 | Kaffenberger | 285/368 |
| 4,030,807 | 6/1977 | Briney | 244/3.16 |
| 4,094,539 | 6/1978 | Reimert | 285/403 |

Primary Examiner—Charles T. Jordan
Attorney, Agent, or Firm—Steven L. Permut; Edward J. Radlo; Robert D. Sanborn

[57] ABSTRACT

A coupling assembly for joining a guidance module housing to a bulkhead of a guided missile. The coupling assembly includes a plurality of levers extending through slots in the housing and bulkhead of the guided missile with a plurality of threaded fasteners extending through the levers and engaging a plate member integral with the housing. The threaded fastener is torqued to impart a pivoting motion to the lever about a fulcrum integral with the plate such that axial directed forces are transferred from the outer periphery of the lever to the housing which is forced to abut the bulkhead.

7 Claims, 3 Drawing Figures

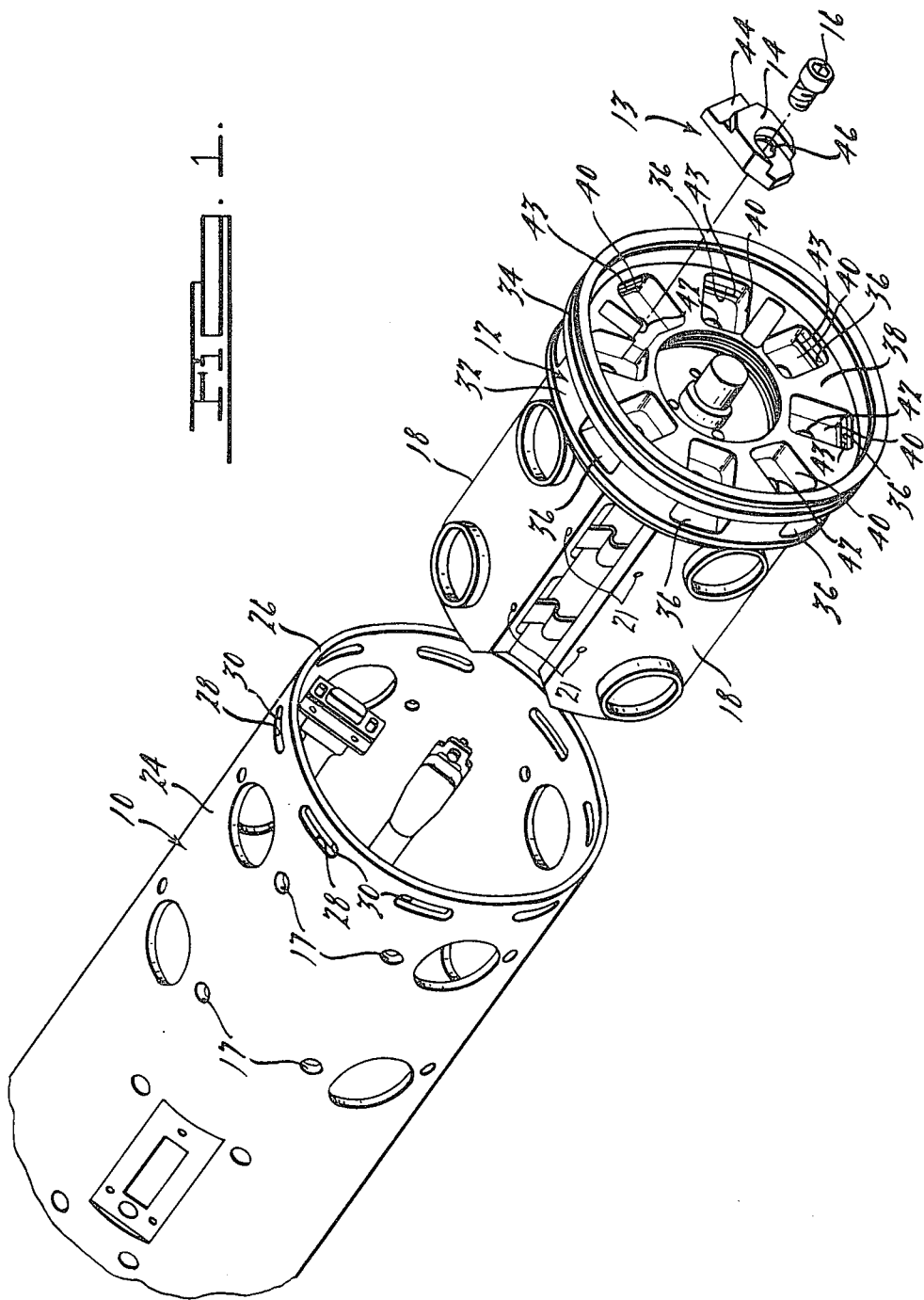

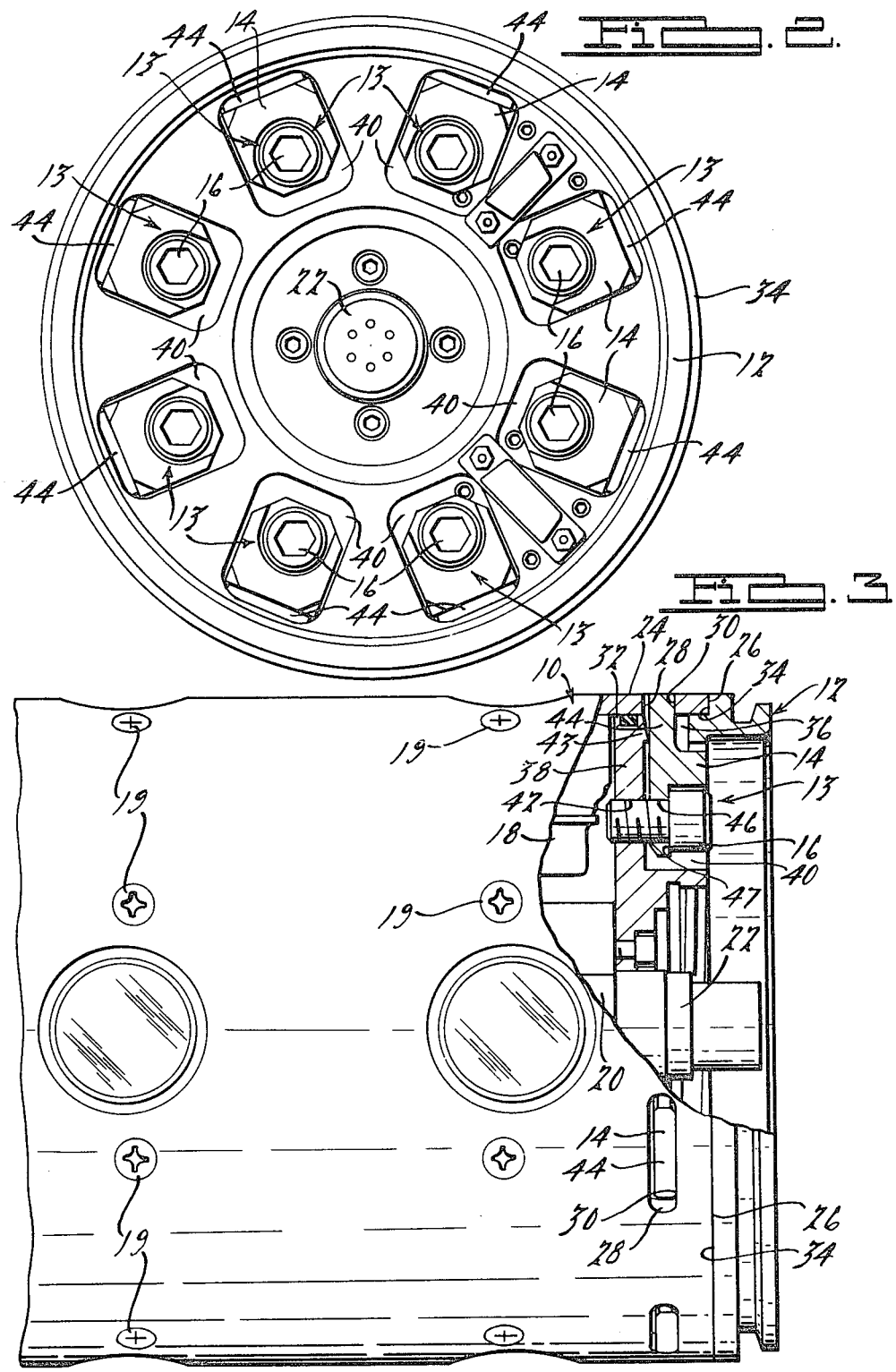

COUPLING ASSEMBLY FOR JOINING TUBULAR SECTIONS

BACKGROUND OF THE INVENTION

1. Field of the Invention

This invention relates generally to couplings and more particularly to a coupling assembly for tubular sections.

2. Disclosure Information

Coupling assemblies for coupling two tubular members together commonly include bolts and nuts or other fastener devices engaging an outwardly extending flange on each tubular member. Each flange usually has apertures therethrough which are aligned and receive the bolts therethrough.

Particular problems occur when the coupled tubular members necessitate an internal coupling mechanism, i.e., a coupling mechanism located entirely within the volume circumscribed by the outer diameters of the tubular members. Internal coupling mechanisms are necessary for tubular members that need an aerodynamic shape such as missile tubular sections or must fit within a fixed diameter outer shell.

U.S. Pat. No. 3,120,402 issued to Whallen on Feb. 4, 1964 discloses a connecting mechanism for tubular projectile sections. The Whallen reference discloses a first tubular member having a retaining ring which engages lugs of a connecting ring secured to the other tubular section. The retaining ring has a locking ring therein which can be rotated with respect to the other two rings to interlock the connecting ring with the retaining ring.

U.S. Pat. No. 2,877,732 issued to Eaton on Mar. 17, 1959 discloses an expandable or contractible band which engages a groove within the inner surface of one tubular member and engages a groove on the outer surface of the second tubular member. The band engages a canted side wall of one of the grooves to clamp the two tubular members together.

U.S. Pat. No. 3,472,538 issued to Vincent et al on Oct. 14, 1969 discloses a coupling assembly that includes a plurality of wedges fitted within windows of a female member and fastened to the male tubular member. The wedges are fastened to the male tubular member by radially extending bolts circumferentially spaced about the longitudinal axis of the tubular sections.

A coupling assembly is needed that can be packaged within the radial confines of two tubular members and can exert a high clamping force along the axial direction of the two tubular members with a minimal amount of radially directed forces. A coupling assembly is also needed that has practical application in mounting guidance system components to a guided missile to withstand high torque moments exerted on the missile and components.

SUMMARY OF THE DISCLOSURE

In accordance with the present invention, a coupling assembly for connecting a first and second tubular member includes a plurality of radially extending lever members positioned radially inwardly from the outer surface of the first tubular member. The first tubular member has circumferentially spaced slots for receiving the radially outer ends of the lever members. The second tubular member has a smaller diameter tubular section which fits within the first tubular member and has spaced slots aligned with the slots in the first tubular member through which the lever members extend. The second tubular member also has a shoulder for abutting one end of the first tubular member.

A plate section is integrally formed within the smaller diameter section of the second tubular member. The plate section has a plurality of fulcrums that operably engage the lever members. The plate section also has a plurality of apertures positioned therein for receiving fasteners that exert an axially directed torque on the lever members toward the plate to pivot the lever members about the fulcrums. The torque exerted on the lever members causes the radially outer end of the lever members to exert an axially directed clamping force on the first tubular member to cause it to forcibly abut the shoulder of the second tubular member.

Broader aspects of the invention are directed to a coupling assembly for connecting a first tubular member to a second member by axially directed forces parallel to the longitudinal axis of the first tubular member. The coupling assembly is positioned radially inward from the outer surface of the first tubular member and presents a minimum amount of radially directed forces on said tubular members.

BRIEF DESCRIPTION OF THE DRAWINGS

Reference now is made to the accompanying drawings in which:

FIG. 1 is an exploded and perspective view of one embodiment according to the invention;

FIG. 2 is a side elevational and partially segmented view of the embodiment shown in FIG. 1 showing one of the coupling assemblies connecting the two tubular members together;

FIG. 3 is a front elevational view of the one embodiment showing the coupling assemblies circumferentially spaced about the axis of the tubular member and being radially extended with respect to said axis.

DETAILED DESCRIPTION OF THE PREFERRED EMBODIMENT

Referring to FIG. 1, a tubular guidance control housing 10 and a tubular bulkhead 12 for a guided missile are connected together by a coupling assembly generally indicated as 13 that comprises a plurality of levers 14 and fasteners 16. (Only one lever 14 and one fastener 16 are shown in FIG. 1 for simplicity of the drawing).

The tubular member 10 houses the guidance controls of a guided missile. The guidance control housing houses several modules 18 which are fastened, as shown in FIG. 3 directly to the tubular member 10 via screws 19 engaging holes 17 in housing and holes 21 in modules 18. A central generator module 20 is fastened directly into the bulkhead 12 via connector 22. The modules 18 and 20 house detectors and other components responsible for the guidance of a missile. Consequently, the housing 10 must be aligned and rigid with the rest of the guided missile for the guidance controls to function accurately. The coupling assembly 13 secures the housing 10 to the bulkhead 12 to resist bending moments of the missile during free flight.

The tubular housing 10 has a cylindrical outer surface 24 and an end 26. A predetermined distance away from the end 26 are a plurality of slots 28 circumferentially spaced about the tubular member 10. Each slot 28 has an edge 30 equally spaced from the end 26 of tubular member 10.

The tubular bulkhead 12 has a smaller diameter section 32 and a shoulder section 34. The smaller diameter section 32 has a plurality of slots 36 therethrough which are alignable with the slots 28 in tubular housing 10. Tubular bulkhead 12 also has an integral central plate section 38 that has a plurality of recesses 40 positioned radially inward from slots 36 and in communication therewith. A plurality of threaded apertures 42 extend through the plate within recesses 40. The plate also has a plurality of shoulders 43 at the transition between the slots 36 and recess 40 which function as a fulcrum.

As shown in FIG. 3, a plurality of coupling assemblies 13 are positioned within recess 40. The coupling assemblies are circumferentially and evenly spaced about the axis of bulkhead 12.

Each coupling assembly is identical so only one coupling assembly is described in the following detail.

Referring to FIG. 2, coupling assembly 13 includes a lever 14 that has an outer peripheral section 44 which extends through slot 36 and slot 28 of tubular members 12 and 10 respectively. Lever 14 abuts shoulder 43 to pivot thereabout. Lever 14 has an aperture 46 extending through a radially inner portion thereof to receive fastener 16 therethrough. The fastener 16 passes through the aperture 46 and threadably engages aperture 42. The shoulder 43 is radially positioned between the fastener 16 and the radially outer peripheral section 44 that abuts edge 30 to slot 28. The lever 14 abuts the head 47 of fastener 16 such that the fastener 16 forces the lever 14 to pivot about shoulder 43 clockwise as shown in FIG. 3. The outer peripheral section 44 of the lever 14 is likewise pivoted about shoulder 43 to axially move the tubular section 10 to the right as shown in FIG. 3 until its end 26 abuts the shoulder section 34. Further tightening of fastener 16 causes a torque moment of the lever about shoulder 43. The torque moment is exerted from the outer peripheral section 44 of lever 16 and axially directed onto slot edge 30 of housing 10. The torque moment causes an axially directed clamping force between housing 10 and the shoulder 34 of bulkhead 12.

The torquing of the fastener 16 causes an appreciable amount of axial directed force from lever 14 onto housing 10 whereas a minimum amount of radial directed force is directed onto the housing 10.

In this fashion, the high clamping forces provide a rigid connection between the housing 10 and bulkhead 12. The housing 10, by being rigidly secured to bulkhead 12, is suitable to have mounted thereon guidance modules 18. The coupling assemblies minimize bending moment between the tubular housing 10 and bulkhead 12 such that the guidance modules can function accurately and assure an accurate flight for the missile. In addition, the coupling assembly is completely contained within the radial confines of the tubular housing and bulkhead to allow the housing 10 and bulkhead 12 to be fitted within the outer shell of the missile. The coupling assembly 13 is also suitable for use with tubular members in other environments.

Variations and modifications of the invention can be made without departing from its spirit or scope as defined in the appended claims.

The embodiments in which an exclusive property or privilege is claimed are defined as follows:

1. A coupling assembly for connecting a first tubular member to a second member, said coupling assembly comprising:
   a plurality of lever members;
   said second member having a plurality of fulcrums for engagement with said levers;
   said plurality of levers being positioned radially inward from the outer surface of said first tubular member and operably abutting said fulcrums;
   said first tubular member having engaging means for engaging said levers and an abutting means for abutting said second member; and
   exerting means for exerting an axially directed force between each of said levers and said second member such that said levers pivot about said fulcrums and exert in turn an axially directed force onto said engaging means of said first tubular member parallel to the central axis of said first tubular member to cause said abutting means to forcibly abut said second member; wherein
   said fulcrums are positioned radially between said engaging means and said exerting means, said fulcrums being closer to said engaging means than to said exerting means.

2. A coupling assembly as defined in claim 1 wherein:
   said engaging means of said first tubular member comprises a plurality of circumferentially spaced slots through said first tubular member; and
   said levers have radial outer ends disposed to be received within said slots, said levers exerting an axial directed force against an edge of said slots toward said second member.

3. A coupling assembly as defined in claim 2 wherein each of said levers has a threaded orifice adapted to receive its associated exerting means.

4. A coupling assembly as defined in claim 1 wherein each lever is positioned axially intermediate an associated fulcrum and an associated exerting means.

5. A coupling assembly for connecting a first tubular member to a second member, said coupling assembly comprising:
   a plurality of lever members;
   one of said first tubular member and second member having a plurality of fulcrums for engagement with said levers;
   said plurality of levers being positioned radially inward from the outer surface of said tubular member and operably abutting said fulcrums;
   said first tubular member having engaging means for engaging said levers and an abutting means for abutting said second member; and
   exerting means for exerting an axially directed force between each of said levers and said second member such that said levers pivot about said fulcrums and exert in turn an axially directed force onto said engaging means of said first tubular member parallel to the central axis of said first tubular member to cause said abutting means to forcibly abut said second member;
   said engaging means of said first tubular member comprising a plurality of circumferentially spaced slots through said first tubular member; and
   said levers having radial outer ends received within said slots and exerting an axial directed force against an edge of said slots toward said second member; wherein
   said fulcrums are positioned between said exerting means and said engaging means;
   said second member comprising:
   a shoulder being positioned to abut said abutting means of said first tubular member;
   a tubular section being sized to fit within said first tubular member; and a plate section operably engaging said exerting means;

said tubular section having slots therethrough aligned with said slots through said first tubular member to receive said levers.

6. A coupling member assembly for connecting a first and second tubular member, said coupling assembly comprising:

a plurality of radially extending levers being positioned radially inwardly from the outer surface of said first tubular member;

said first tubular member having a first series of circumferentially spaced slots for receiving radially outer ends of said levers;

said second tubular member having a smaller diameter tubular section with a second series of circumferentially spaced slots being aligned with said first series of slots in said first tubular member said second tubular member having a shoulder for engagement with one end of said first tubular member;

said second tubular member having a plate section within said smaller diameter tubular section;

said plate section having a plurality of fulcrums for engagement with said levers and having a plurality of apertures positioned radially inward from said fulcrums; and fasteners engaging said levers, extending through said apertures for engagement with said plate section, and exerting an axially directed force on said levers such that said levers pivot about said fulcrums and exert an axially directed force on edges of said slots in said first tubular member toward said shoulder of said second tubular member.

7. A coupling assembly for securing a guidance system of a guided missile to said guided missile comprising:

said guidance system including a tubular housing having guidance modules rigidly secured thereto;

a tubular bulkhead having a complementary guidance module rigidly secured thereto;

a plurality of radially extending lever members being positioned radially inward from the outer surface of said first tubular housing;

said first tubular housing having a first series of circumferentially spaced slots for receiving radially outer ends of said lever;

said bulkhead having a smaller diameter tubular section with a second series of circumferentially spaced slots being aligned with said first series of slots in said first tubular housing;

said bulkhead having a shoulder member for engagement with one end of said first tubular housing;

said bulkhead having a plate section within said smaller diameter tubular section;

said plate section having a plurality of fulcrums for engagement with said levers and having a plurality of apertures positioned radially inward from said fulcrums;

fasteners engaging said levers, extending through said apertures for engagement with said plate section, and exerting an axially directed force on said levers such that said levers pivot about said fulcrums and exert an axially directed force on edges of said slots in said tubular housing toward said shoulder of said bulkhead.

* * * * *